US010178856B2

(12) United States Patent
Mafra-Neto et al.

(10) Patent No.: US 10,178,856 B2
(45) Date of Patent: Jan. 15, 2019

(54) SYSTEMS AND METHODS FOR CLASSIFYING FLYING INSECTS

(71) Applicants: ISCA TECHNOLOGIES, INC., Riverside, CA (US); The Regents of the University of California, Oakland, CA (US)

(72) Inventors: Agenor Mafra-Neto, Riverside, CA (US); Eamonn Keogh, Riverside, CA (US)

(*) Notice: Subject to any disclaimer, the term of this patent is extended or adjusted under 35 U.S.C. 154(b) by 321 days.

(21) Appl. No.: 15/253,286

(22) Filed: Aug. 31, 2016

(65) Prior Publication Data

US 2017/0055511 A1 Mar. 2, 2017

Related U.S. Application Data

(60) Provisional application No. 62/212,744, filed on Sep. 1, 2015.

(51) Int. Cl.
| | |
|---|---|
| *G01J 1/18* | (2006.01) |
| *A01M 1/02* | (2006.01) |
| *G01V 8/20* | (2006.01) |
| *A01M 1/22* | (2006.01) |
| *A01M 1/20* | (2006.01) |
| *A01M 1/10* | (2006.01) |
| *A01M 1/04* | (2006.01) |

(52) U.S. Cl.
CPC .............. *A01M 1/026* (2013.01); *A01M 1/02* (2013.01); *A01M 1/04* (2013.01); *A01M 1/106* (2013.01); *A01M 1/20* (2013.01); *A01M 1/226* (2013.01); *G01V 8/20* (2013.01)

(58) Field of Classification Search
CPC ................ G01J 5/00; H04N 5/30; H04N 5/33
See application file for complete search history.

(56) References Cited

U.S. PATENT DOCUMENTS

| | | |
|---|---|---|
| 2005/0275839 A1 | 12/2005 | Robinson et al. |
| 2009/0097019 A1 | 4/2009 | Baker |
| 2009/0153659 A1 | 6/2009 | Landwehr et al. |
| 2010/0014096 A1* | 1/2010 | Alameh ................ A01M 21/00 356/484 |
| 2010/0186284 A1 | 7/2010 | Hyde et al. |
| 2013/0081573 A1 | 4/2013 | Chen et al. |
| 2015/0234049 A1* | 8/2015 | Weber-Grabau ...... G01S 17/026 356/72 |

OTHER PUBLICATIONS

PCT/US16/49946 International Search Report dated Nov. 21, 2016.

* cited by examiner

*Primary Examiner* — David Porta
*Assistant Examiner* — Mamadou Faye
(74) *Attorney, Agent, or Firm* — Benjamin Diederich

(57) ABSTRACT

Systems, apparatuses, and methods of classifying flying insects. The methods utilize recording the wingbeat frequency and amplitude spectrum of flying insects and comparing them to known or created insect models to properly classify the flying insect. The error rate of the classification is reduced by utilizing multiple inputs to the classification system, which may include a precise circadian rhythm for the time of year, current environmental conditions, and flight velocity or direction.

36 Claims, 2 Drawing Sheets

SYSTEMS AND METHODS FOR CLASSIFYING FLYING INSECTS

CROSS-REFERENCE TO RELATED APPLICATIONS

This application claims the benefit of U.S. Provisional Application No. 62/212,744, filed on Sep. 1, 2015, titled A SYSTEM TO CLASSIFY THE SEX, SPECIES, AND PHYSIOLOGICAL STATE OF FLYING INSECTS, the teachings of which are expressly incorporated by reference.

STATEMENT RE: FEDERALLY SPONSORED RESEARCH/DEVELOPMENT

Not Applicable

BACKGROUND

Field of the Invention

The present disclosure relates generally to systems for identifying flying insects and more particularly to noninvasive systems that optically record the wingbeat frequency of flying insects and convert the optical record to a sound file for accurate characterization and analysis of the recorded flying insect.

Description of the Prior Art

Flying insects have been bother mankind since the beginning of time, whether by destroying agricultural crops, spreading blood borne diseases, or simply interfering with outdoor activities. In order to mitigate these nuisances, it can be critically important to first classify the flying insects that are present in a given location, so that they can be properly managed, and/or for use in entomological research. Having an inexpensive, noninvasive system capable of accurately classifying the flying insects would allow for numerous advances in agricultural and medical applications, as well as in pure entomological research applications.

The idea of automatically classifying insects using the incidental sound of their flight (as opposed to deliberate insect sounds produced by stridulation) dates back to the very dawn of computers and commercially available audio recording equipment. In 1945, three researchers at the Cornell University Medical College, Kahn, Celestin and Offenhauser, used equipment donated by Oliver E. Buckley (then President of the Bell Telephone Laboratories) to record and analyze mosquito sounds. These authors later wrote, "It is the authors' considered opinion that the intensive application of such apparatus will make possible the precise, rapid, and simple observation of natural phenomena related to the sounds of disease-carrying mosquitoes and should lead to the more effective control of such mosquitoes and of the diseases that they transmit."

Since then, there have been sporadic efforts at flying insect classification from audio features, especially in the last decade; however, little real progress seems to have been made. The lack of prior progress may be due in part to the fact that most researchers have used acoustic microphones. Sound attenuates according to an inverse squared law. For example, if an insect flies just three times further away from the microphone, the sound intensity (informally, the loudness) drops to one ninth. Any attempt to mitigate this by using a more sensitive microphone invariably results in extreme sensitivity to wind noise and to ambient noise in the environment. Moreover, the difficulty of collecting data with such devices seems to have led some researchers to obtain data in unnatural conditions. For example, nocturnal insects have been forced to fly by tapping and prodding them under bright halogen lights; insects have been recorded in confined spaces or under extreme temperatures. In some cases, insects were tethered with string to confine them within the range of the microphone. It is hard to imagine that such insect handling could result in data which would generalize to insects in natural conditions.

Furthermore, the vast majority of attempts to classify insects by their flight sounds have explicitly or implicitly used just the wingbeat frequency. However, such an approach is limited to applications in which the insects to be discriminated have very different frequencies (such as a butterfly and a mosquito), and is not well suited for real work applications where there may be multiple insects present with similar wingbeat frequencies.

As such, there is a need for systems and methods for efficiently and economically classifying flying insects by species, sex, physiological state, and other characteristics. Moreover, these systems should be able to classify the flying insects in real-world situations with minimal error rates. Furthermore, there is a need for systems that are capable of identifying flying insects regardless of wherever in the world they may be used, at any point in time, and under any environmental condition.

BRIEF SUMMARY

The systems and methods described herein are capable of obtaining data from flying insects, and classifying them down to the level of the sex, species and/or physiological state. In order to achieve this, insects in flight have the "sound" of their wing beats extracted by an optical sensor. This is achieved by shining a light (source) at a phototransistor (target) and measuring the change in voltage (or electrical resistance or other electrical property). With no insects present there is no change in voltage. As the flying insect interrupts the path of light from the source to the target, its shadow causes a fluctuation in light intensity which the phototransistor converts into a fluctuation in voltage (or other electrical property). Then, an analog-to-digital converter is used to convert these fluctuations into a digital signal (in essence a sound file). Various sound features are extracted from the sound file, including the frequency spectrum (also known as the energy spectral density). This frequency spectrum may be regarded as the insect's signature. This signature may be truncated at both ends to remove spurious data that does not reflect information produced by the insect.

Because the signature is affected by the humidity/temperature and air pressure in which it was recorded, the signature may undergo processing to normalize to a canonical invariant representation. This may be achieved by having the system record the corresponding humidity, temperature, air pressure, and/or other relevant environmental conditions. These environmental conditions are then factored into the analysis to normalize the signature to standard laboratory conditions. This canonical representation is then input into a classifier (for example, a Bayesian Classifier, but other classifiers may also be suitable). Because classifiers are sensitive to the prior probability of seeing a particular insect, that information may also be input into the classifier.

As the prior probability of seeing an insect strongly depends on the time relative to dusk and dawn (i.e. the circadian rhythm), the circadian rhythm of the insect may also be input into the classifier. In particular, one aspect of the present disclosure is the ability to create a circadian rhythm for any possible time of dawn and dusk, given any two distinct circadian rhythms for a particular insect for a particular time of dusk and dawn. This system may then be used to compute the probability of seeing a particular insect at a given time of day, for any given day of year, at any given location on Earth.

Likewise, the signal produced by an insect depends on the air density (which itself depends on altitude, humidity, temperature and air pressure). By measuring these characteristics at the time of the recording, the present system may correct for such differences caused by differences in air density from normal laboratory conditions to reach vastly increased correct identifications as opposed to the prior art.

In accordance with one embodiment of the present disclosure, there is contemplated a system for classifying flying insects. The system includes a power source in electrical connection with an optical insect detector subsystem. The optical insect detector subsystem features a first illuminator that emits a first light transmission, a first phototransistor positioned to receive the first light transmission, a second illuminator that emits a second light transmission, a second phototransistor positioned to receive the second light transmission, and a mechanical divider positioned between the first and second illuminators. The mechanical divider is positioned to block the first light transmission from reaching the second phototransistor and to block the second light transmission from reaching the first phototransistor. Furthermore, the first and second illuminators are positioned a defined distance apart from each other.

The system further includes an analog-to-digital converter in electrical communication with the first and second phototransistors. The analog-to-digital converter is configured to produce a first digital signal from a change in voltage of the first phototransistor and to produce a second digital signal from a change in voltage of the second phototransistor. The system also includes a recording device configured to record the first and second digital signals and a classification subsystem configured to receive the first and second digital signals from the recording device and to output a flying insect identification based upon the first and second digital signals.

The power source may be a battery and the first and second illuminators may be configured to emit at a constant brightness. Further, the first and second light transmissions may be created so as to not interfere with insect behavior. For example, the first and second light transmissions may be invisible to insects and/or may emit no measurable heat. In certain embodiments, the first and second illuminators may be light emitting diodes. More particularly, in certain embodiments, the light emitting diodes may emit a light with a wavelength of approximately 940 nm and may be positioned approximately 1 cm apart from each other.

The system may further include an environmental sensor subsystem. This environmental sensor subsystem may feature at least one sensor configured to measure at least one environmental condition data point surrounding the system. Furthermore, the environmental subsystem may be in electronic communication with the recording device, such that the recording device records the environmental condition data points measured by the sensors and relays said recorded data points to the classification subsystem. The sensors may measure environmental conditions such as, but not limited to, the humidity surrounding the system, the temperature surrounding the system, the air pressure surrounding the system, the ambient light surrounding the system, the current date, the current time, and/or the current location of the system.

The recording device may record the first and second digital signals as an audio file. More particularly, in certain embodiments, the audio file is a stereo audio file and the first digital signal is recorded as a left track and the second digital signal is recorded as a right track. The recording device may further record an amplitude spectrum of the first and second digital signals.

The system may further include a circadian rhythm subsystem. This circadian rhythm subsystem may be configured to calculate a circadian rhythm of an insect intended to be identified by the system based upon at least one environmental condition data point measured by the environmental sensor subsystem. Additionally, or alternatively, the system may further include an actuation subsystem electronically connected to the classification subsystem and configured to actuate a device upon receiving an identification signal from the classification subsystem. Examples of devices that may be actuated include, but are not limited to, a laser configured to kill an insect based upon receiving the identification signal, an electromagnetic capture device configured to capture an insect based upon receiving the identification signal and/or a solenoid valve configured to open and release a chemical based upon receiving the identification signal. The capture device may comprise a cup attached to an electromagnet or an electromagnetically activated door. Exemplary chemicals released by the solenoid valve include insect attractants, insect repellents, pesticides, and larvicides.

Another embodiment contemplated by the present disclosure is an apparatus for classifying flying insects. The apparatus features a power source in electrical connection with an optical insect detector unit. The optical insect detector unit contains a first light emitting diode that emits a first light transmission having a wavelength of approximately 940 nm, a first phototransistor positioned to receive the first light transmission, a second light emitting diode that emits a second light transmission having a wavelength of approximately 940 nm, and a second phototransistor positioned to receive the second light transmission. The first and second light emitting diodes are positioned approximately one centimeter apart from each other. The optical insect detector unit further includes a mechanical divider positioned between the first and second light emitting diodes, such that the mechanical divider blocks the first light transmission from reaching the second phototransistor and blocks the second light transmission from reaching the first phototransistor.

The apparatus further includes an analog-ti-digital converter in electrical communication with the first and second phototransistors. The analog-to-digital converter is configured to produce a first digital signal from a change in voltage of the first phototransistor and to produce a second digital signal from a change in voltage of the second phototransistor. The apparatus also features a recording device configured to record the first and second digital signals as stereo tracks of an audio file and an environmental sensor unit. The environmental sensor unit has at least one sensor configured to measure at least one environmental condition data point surrounding the system. Environmental conditions to be measured include, but are not limited to, humidity, temperature, air pressure, ambient light, current date, current time, and current location. The environmental sensor unit is in electronic communication with the recording device, such that the recording device records the environmental condition data points measured by the sensors.

The apparatus also includes a circadian rhythm unit configured to calculate a synthetic circadian rhythm of the insect intended to be identified by the apparatus. The synthetic circadian rhythm is based upon at least one environmental condition data point measured by the environmental sensor unit, such as the location and/or current date.

The apparatus also has a classification unit configured to receive the first and second digital signals from the recording device and the environmental condition data points. The classification unit outputs a flying insect identification based upon the first and second digital signals, at least one environmental condition data point, and the calculated synthetic circadian rhythm. The apparatus may be a standalone device or may be contained within or attached to an insect trap.

Another embodiment envisioned by the present disclosure includes methods of classifying flying insects. These methods include the steps of recording a first set of data of the life cycle of a flying insect at set environmental conditions utilizing a first day and night cycle. This data includes at least the insect's wingbeat frequency, amplitude spectrum, and circadian rhythm and recording a second set of data of the life cycle of the flying insect at set environmental conditions utilizing a different, second day and night cycle. Similarly, the data recorded includes at least the insect's wingbeat frequency, amplitude spectrum, and circadian rhythm. Then, a data model of the flying insect is created based upon the data recorded in the earlier steps. This data model is then input into a classifier. After that, environmental conditions are recorded where the flying insect is to be classified. A synthetic circadian rhythm is then created based upon the data model and the recorded environmental conditions.

A first signal containing the wingbeat frequency and amplitude spectrum of the flying insect to be classified is recorded and a second signal containing the wingbeat frequency and amplitude spectrum of the flying insect to be classified is also recorded. The second signal is captured at a known distance from the first signal. By doing so, one is able to calculate the approximate velocity and flight direction of the insect. The first and second signals are then processed to normalize the signals based on the synthetic circadian rhythm and the current environmental conditions. These processed signals are then input into the classifier, which classifies the insect based upon the inputted signals and the data model.

The method may be utilized to classify the insect based on species, sex, or wing variation. Furthermore, the environmental conditions may be used to compensate for air density differences between those of the model and those of current conditions, and the resulting changes to the amplitude spectrum currently recorded from those recorded in the initial data recording steps. Moreover, the method may further include operating an actuator based upon the classification results.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below is intended as a description of the presently preferred embodiment of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention.

One aspect of the present disclosure is a system that can non-evasively capture signals from flying insects, and use this information to classify the insects by species, physiological state, and/or sex (if the insect is sexually dimorphic). This system can be a standalone device, or can be integrated into the entrance of, or within, a standard insect trap. Examples of physiological state include both natural physiological states and those induced by researchers. An example of a natural physiological state that can be differentiated by the presently disclosed systems is whether a female mosquito has or has not recently taken a blood meal. Whereas an example of an induced physiological state, is when a researcher has deliberately removed part of the wing(s) of an insect. It is known in the art that a large area of insect wings can be removed with minimal effect on load-lifting ability. Furthermore, it is known that combinatorial wing damage patterns can be utilized to mark an insect. For example, the anal veins of a left wing on an insect may be removed, while the radius of a right wing of the insect may also be removed. Since the systems described herein are capable of differentiating the slight changes in flight behavior caused by such intentional marking of the insect's wings, they may be very useful in mark-and-recapture applications. Mark-and-recapture is frequently used to estimate, among other things, the size of a population of insects within an area.

Figure 1:
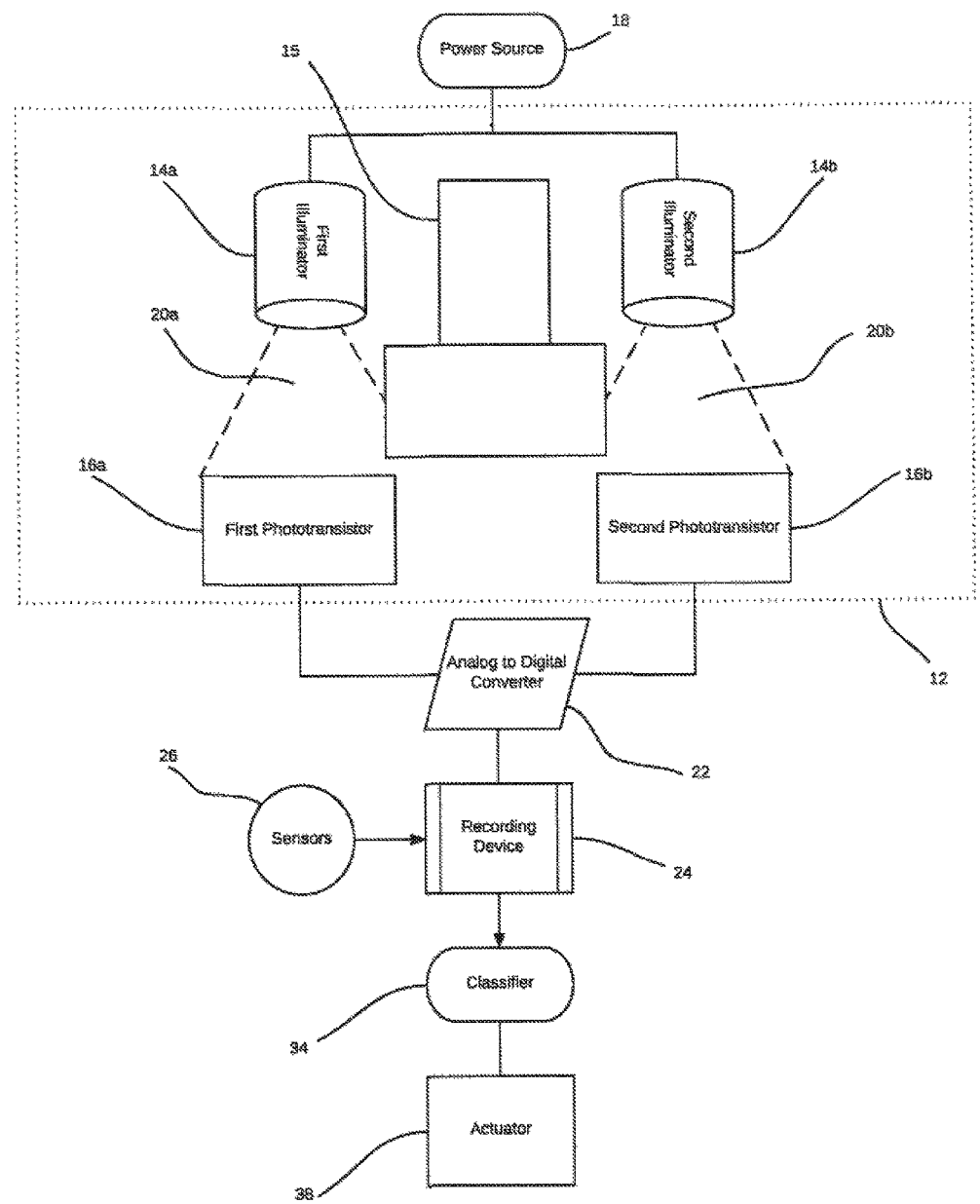
FIG. 1 is a schematic view of the systems and apparatuses of the present disclosure.

One example embodiment system 10 is schematically shown in FIG. 1, and includes an optical insect detector subsystem 12. The optical insect detector subsystem 12 includes a plurality of light sources (or illuminators) 14a,b and an equal number of phototransistors 16a,b. The optical insect detector subsystem 12 is electrically connected to, and powered by a, a power source 18. The power source 18 may be, for example, a battery. In order to eliminate false readings, the illuminators 14a,b should produce a constant brightness. Another important consideration, for best results, is that the illuminators 14a,b (or the heat they produce) should not affect the behavior of the insects. Accordingly, a suitable light source is, for example, an LED that emits light at a wavelength of at, or around, 940 nm (infrared). This wavelength is not visible to insects (or humans) and does not produce any detectable heat.

A first illuminator 14a and a first phototransistor 16a face each other from some distance, such that some of the light 20a that is emitted from the first illuminator 14a falls upon the first phototransistor 16a. In this embodiment, the optical insect detector subsystem 12 utilizes two illuminators 14a,b and two corresponding phototransistors 16a,b, which are placed in a parallel, side-by-side arrangement, some small distance apart, such that the light 20a from the first illuminator 14a only falls upon the first phototransistor 16a, and light 20b from a second illuminator 14b falls only upon a second phototransistor 16*b*. In this embodiment, the illuminators 14*a,b* are placed approximately one centimeter apart. In the absence of insects, or anything else, that blocks part of the light 20*a,b*, the amount of light 20*a,b* that falls on the phototransistors 16*a,b* is constant. Furthermore, by examining the timing difference between when an insect crosses the first light beam 20*a* and the second light beam 20*b*, the system 10 can infer the speed and direction of travel of the insect. The speed and direction of travel are two inputs that may be fed into the system's classification algorithms to identify the flying insect.

The phototransistors 16*a,b* are connected to an analog to digital converter 22, and in a constant light field, no signal 23 (not shown) is produced. However, when an object blocks all or part of the light 20*a,b* from the illuminators 14*a,b*, the phototransistors 16*a,b* will create a changing voltage that the analog to digital converter 22 will convert to a signal 23. The signal 23 produced by the analog to digital converter 22 is then captured by a recording device 24. While this signal 23 is recorded optically as described above, it is effectively a sound file, and can be saved in any standard computer sound file format (e.g., as a WAV file), and if played on a standard audio device sounds like a conventionally recorded sound file recorded with a microphone. Furthermore, since this embodiment utilizes two illuminators 14*a,b* and two phototransistors 16*a,b*, two separate signals 23*a,b* will be produced by the analog to digital converter 22, which can be recorded as separate stereo tracks by the recording device 24.

The system 10 continuously records and monitors the two independent signals 23*a,b*. In the absence of insects there should be no signal 23 produced. In practice, however, electronic devices always produce a tiny amount of signal due to noise in the circuit (for example, wires within the electronics may act as a weak antenna, picking up a tiny amount of radio signals or other electromagnetic interference). Accordingly, the system 10 will typically utilize a threshold to determine if the device is currently seeing a signal 23 caused by the presence of an insect or not. This threshold can be computed in several ways. For example, the device can be scaled so that there are no insects present, at which point the mean and standard deviation of the noise amplitude is measured. In one embodiment, the signal threshold is then set to be the measured mean plus four standard deviations.

In use, when an insect flies past the two light beams 20*a,b*, the analog to digital converter 22 will produce signals 23*a,b* whose amplitude greatly exceed the threshold. The recording device 24 then records a sound snippet of the interception event. In certain embodiments, the sound snippet is recorded from one second before the interception, to one second after the interception. The system 10 is able to record a sound snippet of this event one second before it happens, by maintaining the signals 23*a,b* in a circular buffer. That is, the recording device 24 is constantly recording the signals 23*a,b* in a constant loop, and when an interception event occurs, the recording is tagged to begin at one second prior in the recording loop.

The system 10 further utilizes sensors 26 to measure environmental conditions surrounding the system 10. Examples of information that may be measured by the sensors 26 include, but are not limited to, the humidity, temperature, air pressure, ambient light, date, time, and location on Earth. The sensors 26 are in electrical communication with the recording device 24, such that information measured by the sensors 26 is sent to be recorded by the recording device 24.

The recording device 24 is therefore able to create a holistic record of the insect interception event that may include, among other things, a stereo sound file containing the signals 23*a,b*, assigned to specific stereo tracks; humidity; temperature; air pressure; ambient light; date; time; location on Earth, and/or the amplitude spectrum derived from the stereo sound file. The amplitude spectrum is a vector of real numbers, and provides an additional important piece of information useful in differentiating one species from another that have similar wingbeat frequencies. By additionally recording and analyzing the amplitude spectrum, error rates in correctly identifying the species are dramatically reduced. This is similar to the scenario wherein an individual can differentiate middle C played on a piano and middle C played on a violin. While middle C on both instruments has the same frequency, additional information is conveyed beyond merely the frequency. This additional information contained within the amplitude spectrum leads to a dramatic decrease in error rate from simply using the wingbeat frequency alone. In one embodiment, values that correspond to frequencies less than 20 Hz or greater than 2000 Hz are eliminated, since such data is very unlikely to contribute true signal generated by an insect. This information may be recorded in various sound file formats, for example WAV or MP3 formats. Furthermore, when recording the data, the two signals 23*a,b* may be recorded as stereo sound tracks and the remaining data may be embedded within the sound file as metadata.

Offline Learning and Insect Models

While the identification system described above is greatly improved over that of the prior art, it still may face potential problems when attempting to identify unrelated flying insects that have similar wingbeat frequencies. However, with each new piece of information that can be provided to the classifier, the error rate is greatly reduced.

Any attempt to classify flying insects benefits from having high quality data models of the insect's flight behavior, and the prior probability of seeing that sex or species of insect at a given time, on a given day of the year at a given location on Earth. Moreover, it is known that insect's flight behavior depends on environmental conditions. However, under prior art practices, given all these variables, obtaining high quality data models that span the space of all possibilities has proven to be difficult, if not impossible. The methods of the present disclosure mitigate this problem with the addition of an offline learning step 28 and insect modeling steps 30*a,b*.

This offline learning step 28 can be achieved by placing a system 10 into an insectary (not shown) with juvenile insects of a single species, and single sex and species for sexually dimorphic insects (i.e. pupa for mosquitoes, maggots for flies, bees and wasps, etc.) and any food, water or other items needed to sustain healthy adult insect. The system 10 is operated continuously to record the emerging insects, 24 hours a day, for their entire adult lives.

This recording is conducted at a fixed humidity, temperature, and air pressure, with a fixed artificial day and night cycle (e.g., 16 hours of darkness, followed by 8 hours of light, with a five minute linear ramp-up/ramp-down of the brightness to simulate dawn and dusk). A similar recording is conducted utilizing a different fixed artificial day and night cycle (e.g., 12 hours of darkness followed by 12 hours of light), with otherwise the same environmental conditions as the first recording.

Figure 2:
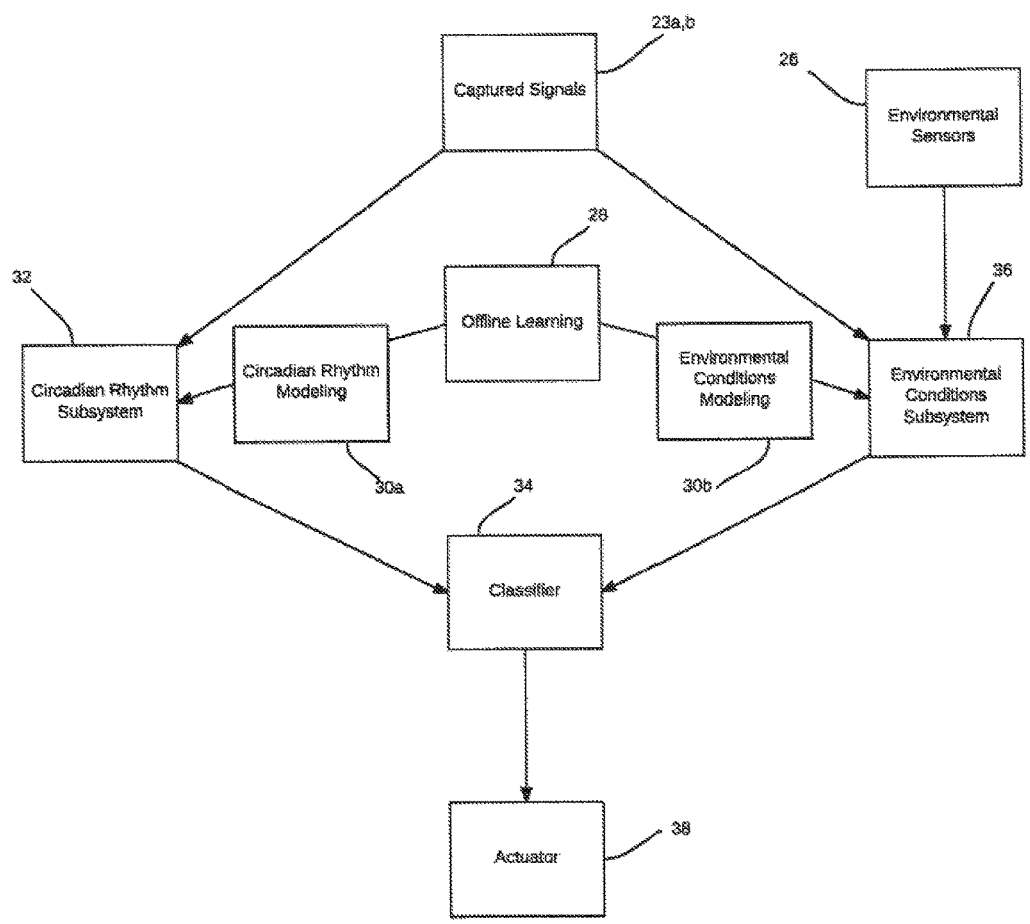
FIG. 2 is a flowchart of the methods described in the present disclosure.

Collecting data in the manner allows the creation of excellent insect models regarding the circadian rhythm 30*a* of the insect, for those recorded environment conditions. However, the real world does not necessarily operate under such ideal conditions. As such, the methods of the present disclosure allow for the generalization from the recorded conditions in the offline learning step 28 to any reasonable single environment condition 30b, as shown in the flowchart of FIG. 2.

Generalizing to Achieve Invariance to the Circadian Rhythm

The probability that a given insect will be flying at a given time of day (relative to sunrise/sunset) can be encoded in a flight activity circadian rhythm. Certain embodiments of systems and methods described herein may include a circadian rhythm subsystem 32 that can create an insect specific circadian rhythm for any day of the year, for any location on Earth, after seeing just two distinct example circadian rhythms for that insect in the offline learning step 28. Because this prior probability can vary by orders of magnitude over the course of the day, it greatly affects the ability to correctly identify insects.

For example, the daily flight rhythms of *Culex tarsalis* and *Aedes aegypti* are very different, and offer a useful feature for the Bayesian classifier used in one embodiment of the system 10. To show how this would be utilized, an insect detected at 3 am is about four times more likely to be a *Cx. tarsalis*, whereas an insect spotted at midday is almost certainly an *Ae. aegypti*.

The circadian rhythm subsystem 32, given two distinct circadian rhythms observed during the offline learning step 28, can produce a high quality approximation to the circadian rhythm that would be observed for any timing of dawn and dusk via the circadian rhythm modeling step 30a. The system 10 creates a synthetic circadian rhythm in the circadian rhythm modeling step 30a using a type of inverted Dynamic Time Warping (DTW) based on the information provided from the offline learning step 28. Normally, the DTW algorithm takes as input two time series, C and Q, and produces a warping path in an alignment matrix as a side effect of calculating the distance DTW(Q,C). In contrast, the system 10 uses a modified DTW algorithm to align the two given two distinct circadian rhythms to the desired circadian rhythm (the latter specified by desired time of dawn and dusk). The amount of x-axis "warping" needed to convert the observed circadian rhythms into the desired circadian rhythm is used as an input into a regression algorithm, which is then used to set the y-axis value of the circadian rhythm. Accordingly, the circadian rhythm subsystem 32 takes the synthetic circadian rhythm produced in step 30a and the captured signals 23a,b and feeds this information to the classifier 34.

Generalizing to Achieve Invariance to the Humidity Temperature and Air Pressure

Many research papers over the last four decades have examined how insect flight (usually, just considering the wingbeat frequency) varies with altitude, humidity, temperature or air pressure. However, all of the above mostly affect the flight behavior by affecting the density of the air. The density of the air for a given temperature or air pressure can be computed using the ideal gas law. Additionally, if it is desired to compensate for humidity (humid air is less dense than dry air) the density of humid air may be calculated as a mixture of ideal gases. As it is known that air density affects the amplitude spectrum, this can be adjusted to compensate for the differences in the ambient environment from ideal test conditions.

Given the above, in the offline learning step 28, data is collected about various insects at at least one canonical set of environmental conditions (typically, temp=80° F., Humidity=20%, light cycle 16|8). This data is then utilized in an environmental conditions modeling step 30b to create an environmental conditions subsystem 36. Accordingly, the captured signals 23a,b and information provided from the environmental sensors 26 can be input into the environmental conditions subsystem 36 to render data that has been compensated based on the environmental conditions to match those of ideal test conditions. Alternatively, one can collect data about various insects at ambient environmental conditions and normalize it to reflect what would have been observed at the canonical set of environmental conditions. The captured signals 23a,b as modified by the environmental conditions subsystem 36 are then fed to the classifier 34.

Usage

The information gathered from the offline learning step 28, including amplitude spectrum, wingbeat frequency, daily flight rhythms, average flight speed and/or direction, etc. is used to build the classifier 34. While any classifier may be used, in certain embodiments a Bayesian Classifier is utilized.

During deployment, the system 10 is placed in the desired location and switched on. After the insect signals 23a,b are captured, the system 10 normalizes the signals 23a,b to achieve invariance to ambient altitude, humidity, temperature and air pressure with the environmental conditions subsystem 36, and to the current time of dawn/dusk with the circadian rhythm subsystem 32. The output from these subsystems 32, 36 is then input into the classifier 34, which produces the predicted class label of the sex and/or species and/or physiological state.

Given that the system 10 is able to classify the sex, species, and physiological states of insects in real time, the system 10 may optionally use the ability to classify a single insect, or the cumulative number/ratios of classified insects observed thus far, to control an actuator 38. For example, an actuator 38 can be used to selectively kill insects based on their sex. This is a potentially useful ability to support sterile insect technique (SIT) for mosquitoes. In such cases you want to release only males from a trap or insectary. However, other embodiments could allow for the actuator 38 to kill only a particular pest insect while allowing a beneficial insect to escape the trap unharmed. An exemplary kill method would utilize a powerful laser aimed at the exit of a trap or insectary, wherein the actuator 38 activates the laser to kill the desired insect. Upon attempting to exit the trap, the insect is classified via the system 10, and if it is determined to be a target insect, the actuator 38 activates the laser. When a non-target insect is identified, the system 10 does not activate the actuator 38.

In another embodiment, rather than killing a target insect, the actuator 38 may be utilized to capture the target insect. In this case, the system 10 is attached to an apparatus that can capture living insects, such as a simple plastic cup suspend over a flat surface. The cup may be held up by an electromagnet connected to the actuator 38. When a target insect is identified by the system 10, a signal is sent to the actuator 38 to turn off the electromagnet, causing the cup to drop on top of the target insect, thereby capturing it. Alternatively, the actuator 38 could close a door in a trap, thereby retaining the target insect inside the trap.

In yet another embodiment, the system 10 is used to control at least one valve solenoid. The solenoid may be opened by the actuator 38 to release chemicals in response to the identification of a single insect, or the cumulative number/ratios of identified insects observed thus far. Examples of chemicals that may be released include, but are not limited to, attractants, repellents, pesticides or larvicides.

Examples of commercial applications of the present systems and methods include:

Agricultural:

Insect pests destroy billions of dollars worth of food each year. Any attempt to mitigate their harmful effects requires knowing the density of the species present (and sometimes the sex of the insects). The present systems can provide this species/sex count in real time.

Vector Control Districts:

Most vector control districts spend considerable effort to quantify the density of various mosquitoes in their district. Using conventional methods, this information can be inaccurate, out-of-date (by days or even weeks) and expensive to obtain. The present systems can provide real-time accurate information at a very low amortized cost.

Residential Mosquito Control:

There are several companies that sell devices to lure and kill mosquitoes. Such devices could be augmented with the present systems, to let the user know how successful the mosquito traps are in real time. Furthermore, this information could be actionable. For example, it could help the user optimize trap placement, or provide the user with information to reschedule an outdoor event if the noted density of mosquitoes is trending up.

The above description is given by way of example, and not limitation. Given the above disclosure, one skilled in the art could devise variations that are within the scope and spirit of the invention disclosed herein, including various ways of using the actuator 38 to control insect behavior in some way upon identifying a single insect or the cumulative number/ratios of identified insects, such as capturing the insect(s), killing the insect(s), and/or luring or repelling insect(s) with chemicals, sounds, or lights.

Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A system for classifying flying insects, said system comprising:
    a power source in electrical connection with an optical insect detector subsystem, said optical insect detector subsystem comprising:
        a first illuminator that emits a first light transmission;
        a first phototransistor positioned to receive the first light transmission;
        a second illuminator that emits a second light transmission;
        a second phototransistor positioned to receive the second light transmission;
        a mechanical divider positioned between the first and second illuminators, such that the mechanical divider blocks the first light transmission from reaching the second phototransistor and blocks the second light transmission from reaching the first phototransistor, and
        wherein the first and second illuminators are positioned a defined distance apart from each other;
    an analog-to-digital converter in electrical communication with the first and second phototransistors, wherein the analog-to-digital converter is configured to produce a first digital signal from a change in voltage of the first phototransistor and to produce a second digital signal from a change in voltage of the second phototransistor;
    a recording device configured to record the first and second digital signals; and
    a classification subsystem configured to receive the first and second digital signals from the recording device and to output a flying insect identification based upon the first and second digital signals.

2. The system of claim 1, wherein the power source is a battery.

3. The system of claim 1, wherein the first and second illuminators emit first and second light transmissions of a constant brightness.

4. The system of claim 3, wherein the first and second light transmissions to not interfere with insect behavior.

5. The system of claim 4, wherein the first and second light transmissions are invisible to insects.

6. The system of claim 1, wherein the first and second illuminators emit no measurable heat.

7. The system of claim 1, wherein the first and second illuminators are light emitting diodes.

8. The system of claim 7, wherein the light emitting diodes emit a light with a wavelength of approximately 940 nm.

9. The system of claim 1, wherein the first and second illuminators are positioned approximately 1 cm apart from each other.

10. The system of claim 1, further comprising an environmental sensor subsystem, said environmental sensor subsystem comprising:
    at least one sensor configured to measure at least one environmental condition data point surrounding the system,
    wherein the environmental subsystem is in electronic communication with the recording device, such that the recording device records the at least one environmental condition data point measured by the at least one sensor and relays said recorded data point to the classification subsystem.

11. The system of claim 10, wherein the at least one sensor measures the humidity surrounding the system.

12. The system of claim 10, wherein the at least one sensor measures the temperature surrounding the system.

13. The system of claim 10, wherein the at least one sensor measures the air pressure surrounding the system.

14. The system of claim 10, wherein the at least one sensor measures the ambient light surrounding the system.

15. The system of claim 10, wherein the at least one sensor measures the current date.

16. The system of claim 10, wherein the at least one sensor measures the current time.

17. The system of claim 10, wherein the at least one sensor measures the current location of the system.

18. The system of claim 1, wherein the recording device records the first and second digital signals as an audio file.

19. The system of claim 18, wherein the audio file is a stereo audio file and the first digital signal is recorded as a left track and the second digital signal is recorded as a right track.

20. The system of claim 1, wherein the recording device further records an amplitude spectrum of the first and second digital signals.

21. The system of claim 10, further comprising a circadian rhythm subsystem, said circadian rhythm subsystem configured to calculate a circadian rhythm of an insect intended to be identified by the system based upon at least one environmental condition data point measured by the environmental sensor subsystem.

22. The system of claim 1, further comprising an actuation subsystem electronically connected to the classification subsystem and configured to actuate a device upon receiving an identification signal from the classification subsystem.

23. The system of claim 22, wherein the device is a laser configured to kill an insect based upon receiving the identification signal.

24. The system of claim 22, wherein the device is an electromagnetic capture device configured to capture an insect based upon receiving the identification signal.

25. The system of claim 24, wherein the capture device comprises a cup attached to an electromagnet.

26. The system of claim 24, wherein the capture device comprises an electromagnetically activated door.

27. The system of claim 22, wherein the device is a solenoid valve configured to open and release a chemical based upon receiving the identification signal.

28. The system of claim 27, wherein the chemical is selected from the group consisting of attractants, repellents, pesticides, and larvicides.

29. An apparatus for classifying flying insects, said apparatus comprising:
   a power source in electrical connection with an optical insect detector unit, said optical insect detector unit comprising:
      a first light emitting diode that emits a first light transmission having a wavelength of approximately 940 nm;
      a first phototransistor positioned to receive the first light transmission;
      a second light emitting diode that emits a second light transmission having a wavelength of approximately 940 nm;
      a second phototransistor positioned to receive the second light transmission;
      a mechanical divider positioned between the first and second light emitting diodes, such that the mechanical divider blocks the first light transmission from reaching the second phototransistor and blocks the second light transmission from reaching the first phototransistor, and
      wherein the first and second light emitting diodes are positioned approximately one centimeter apart from each other,
   an analog-to-digital converter in electrical communication with the first and second phototransistors, wherein the analog-to-digital converter is configured to produce a first digital signal from a change in voltage of the first phototransistor and to produce a second digital signal from a change in voltage of the second phototransistor,
   a recording device configured to record the first and second digital signals as stereo tracks of an audio file;
   an environmental sensor unit comprising:
      at least one sensor configured to measure at least one environmental condition data point surrounding the system selected from the group consisting of the humidity, temperature, air pressure, ambient light, current date, current time, and current location,
      wherein the environmental sensor unit is in electronic communication with the recording device, such that the recording device records the at least one environmental condition data point measured by the at least one sensor;
   a circadian rhythm unit configured to calculate a synthetic circadian rhythm of an insect intended to be identified by the apparatus based upon at least one environmental condition data point measured by the environmental sensor unit; and
   a classification unit configured to receive the first and second digital signals from the recording device and the at least one environmental condition data point and to output a flying insect identification based upon the first and second digital signals, at least one environmental condition data point, and the calculated synthetic circadian rhythm.

30. The apparatus of claim 29, wherein the apparatus is contained within or attached to an insect trap.

31. A method of classifying a flying insect comprising the following steps:
   a) recording a first set of data of the life cycle of the flying insect at set environmental conditions utilizing a first day and night cycle, wherein the data recorded includes at least the insect's wingbeat frequency, amplitude spectrum, and circadian rhythm;
   b) recording a second set of data of the life cycle of the flying insect at set environmental conditions utilizing a different, second day and night cycle wherein the data recorded includes at least the insect's wingbeat frequency, amplitude spectrum, and circadian rhythm;
   c) creating a data model of the flying insect based upon the data recorded in steps (a) and (b);
   d) inputting the data model created in step (c) into a classifier,
   e) recording environmental conditions wherein the flying insect is to be classified;
   f) creating a synthetic circadian rhythm based upon the data model created in step (c) and the recorded environmental conditions in step (e);
   g) recording a first signal containing the wingbeat frequency and amplitude spectrum of the flying insect to be classified;
   h) recording a second signal containing the wingbeat frequency and amplitude spectrum of the flying insect to be classified, wherein the second signal is captured at a known distance from the first signal;
   i) processing the first and second signals recorded in steps (g) and (h) to normalize the signals based on the synthetic circadian rhythm created in step (f) and the environmental conditions recorded in step (e);
   j) inputting the first and second signals processed in step (i) into the classifier,
   k) classifying the insect based upon the signals inputted in step (j) and the data model input in step (d).

32. The method of claim 31, wherein the classifier is configured to classify the insect based on species.

33. The method of claim 31, wherein the classifier is configured to classify the insect based on sex.

34. The method of claim 31, wherein the classifier is configured to classify the insect based on wing variation.

35. The method of claim 31, wherein the environmental conditions recorded in step (e) are used to compensate for air density differences in step (i), and the resulting changes to the amplitude spectrum recorded in steps (g) and (h) from those recorded in steps (a) and (b) for the flying insect.

36. The method of claim 31, further comprising the step l) operating an actuator based upon the classification result of step (k).

* * * * *